United States Patent [19]

Kawaguchi et al.

[11] 4,161,339
[45] Jul. 17, 1979

[54] CONTROL VALVE FOR USE IN AUTOMOTIVE BRAKE SYSTEM FOR CONTROLLING BRAKE FLUID PRESSURE

[75] Inventors: Hiroshi Kawaguchi, Mishima; Yoshihisa Nomura, Toyota, both of Japan

[73] Assignee: Toyota Jidosha Kogyo Kabushiki Kaisha, Toyota, Japan

[21] Appl. No.: 819,345

[22] Filed: Jul. 27, 1977

[30] Foreign Application Priority Data

Feb. 4, 1977 [JP] Japan .......................... 52-12326[U]

[51] Int. Cl.² .............................................. B60T 8/14
[52] U.S. Cl. ................................ 303/24 F; 188/349; 303/6 C; 303/24 C
[58] Field of Search ............. 137/38, 109, 110, 513.3, 137/599; 138/45 A, 46; 188/195, 349; 303/6 C, 22 R, 24 R, 24 A, 24 C, 24 F

[56] References Cited

U.S. PATENT DOCUMENTS

| | | | |
|---|---|---|---|
| 2,218,194 | 10/1940 | Freeman | 188/349 |
| 2,242,297 | 5/1941 | Freeman | 188/349 |
| 3,087,761 | 4/1963 | Stelzer | 303/24 F |
| 3,143,125 | 8/1964 | Stelzer | 137/38 |
| 3,143,379 | 8/1964 | Eksergian | 303/24 C |
| 3,147,045 | 9/1964 | Stelzer | 303/24 C |
| 3,385,308 | 5/1968 | Farr | 137/38 |
| 3,398,757 | 8/1968 | Milster | 137/38 |
| 3,489,465 | 1/1970 | Bueler | 303/24 C |
| 3,663,067 | 5/1972 | Yabuta | 303/6 C |
| 3,677,605 | 7/1972 | Matsumoto et al. | 303/6 C |
| 3,719,401 | 3/1973 | Peruglia | 137/513.3 X |
| 3,727,990 | 8/1973 | Vogt | 303/6 C |
| 3,899,217 | 8/1975 | Ohta | 303/24 C |
| 3,941,431 | 3/1976 | Giordano et al. | 303/24 A |
| 3,944,293 | 3/1976 | Ishigama et al. | 303/24 F |
| 3,975,062 | 8/1976 | Giordano et al. | 303/22 R |

FOREIGN PATENT DOCUMENTS

1079505  2/1964  United Kingdom .................. 303/24 C

Primary Examiner—Stephen G. Kunin
Attorney, Agent, or Firm—Cushman, Darby & Cushman

[57] ABSTRACT

A control valve for use in an automotive brake system for controlling the brake fluid pressure in rear-wheel cylinders of the type include an inlet chamber communicated with a master cylinder, an outlet chamber in communication with the rear-wheel cylinders, a valve chamber in hydraulic communication with both of the inlet and outlet chambers, the latter being communicated through a valve port, a ball valve floatingly disposed within the valve chamber and actuable to close the valve port when the deceleration of an automotive vehicle reaches a predetermined level, and a differential piston with its free ends disposed in the inlet and outlet chambers, respectively, to be exerted with the brake fluid pressure therein. A variable restriction is disposed upstream or downstream of the valve chamber and is actuable in response to the flow rate of brake fluid flowing therethrough in such a manner that when the flow rate exceeds a predetermined value, the flow of brake fluid may be restricted, thereby eliminating the departure of braking force distribution from an idealized distribution when brakes are abruptly applied.

7 Claims, 4 Drawing Figures

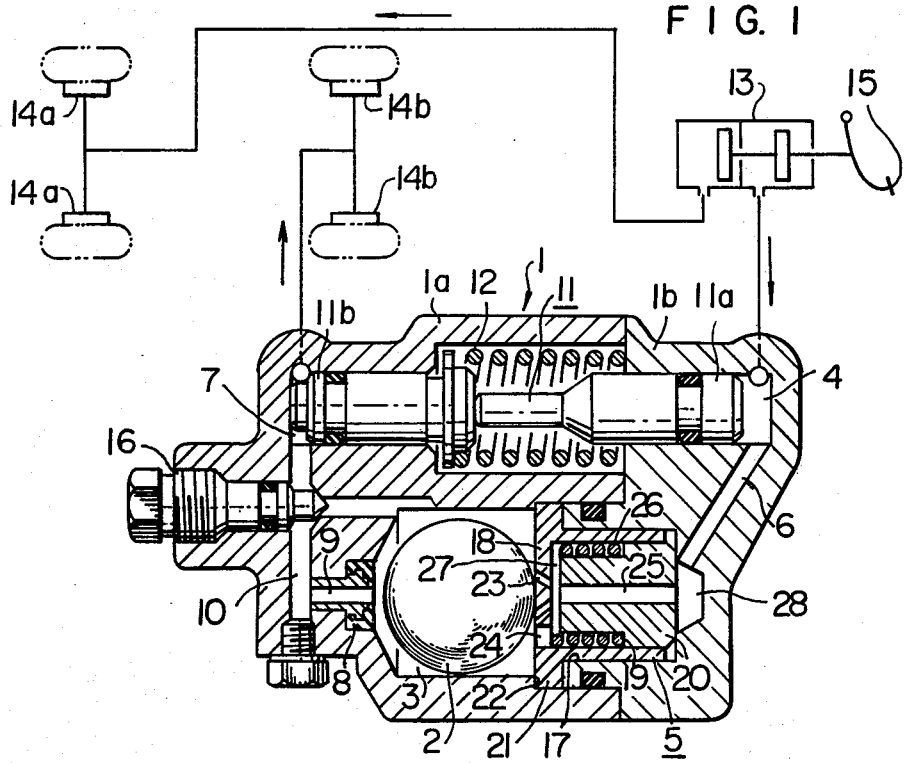

CONTROL VALVE FOR USE IN AUTOMOTIVE BRAKE SYSTEM FOR CONTROLLING BRAKE FLUID PRESSURE

FIELD OF THE INVENTION

The present invention relates generally to a control valve for use in an automotive brake system for controlling the brake fluid pressure and more particularly a deceleration-sensitive, brake fluid pressure control valve inserted in brake line intercommunicating a master cylinder and rear-wheel cylinders and controlling the pressure of brake fluid supplied to the rear-wheel cylinders in response to the deceleration of an automotive vehicle when brakes are applied.

BACKGROUND OF THE INVENTION

It has been a well known theory in the art that in order to attain stable braking action by causing both the front and rear wheels to decelerate at the same rate, the rate of increase in pressure of brake fluid to be supplied to rear-wheel cylinders from a master cylinder must be so controlled as to gradually reduce as compared with the rate of increase of pressure of brake fluid to be supplied to front-wheel cylinders. For this purpose, the conventional automotive brakes systems have incorporated in general deceleration sensitive brake fluid pressure control valves inserted in brake lines communicating the master cylinder and the rear-wheel cylinders. The deceleration-sensitive, brake fluid pressure control valves comprise in general a ball valve floatingly disposed within a valve chamber in communication with the master cylinder and the rear-wheel cylinders, and a differential piston whose free ends are exerted with the hydraulic pressure on the side of the master cylinder and the hydraulic pressure on the side of the rear-wheel cylinders, respectively. When the deceleration of an automotive vehicle reaches a predetermined value, the ball valve is caused to move forwardly by its own inertia to close the valve port, thereby interrupting the communication between the master cylinder and the rear-wheel cylinders and thereafter the hydraulic pressure on the side of the master cylinder is transmitted through the differential piston to the rear-wheel cylinders at a predetermined decreased ratio so that the hydraulic pressure in the rear-wheel cylinders may be increased at a decreased rate as compared with the pressure build-up in the front-wheel cylinders. Thus the hydraulic pressure in the rear-wheel cylinders increases at the same rate as in the front-wheel cylinders until the ball valve closes the valve port, and once the valve port has been closed the hydraulic pressure in the rear-wheel cylinders increases at a rate slower than in the front-wheel cylinders. As a result, a curve representative of the braking force distribution between the front and rear wheels has a flexing point at a position corresponding to the time when the valve port is closed with the ball valve and is therefore approximately similar to an idealized braking force distribution characteristic curve.

However delay in response to the ball valve; that is, a time interval between the time when the deceleration reaches a predetermined value and the time when the ball valve closes the valve port, is inevitable in the control valves of the type described above. As a result when the hydraulic pressure in the master cylinder rapidly increases a result of rapid or abrupt brake application, the hydraulic pressure in the rear-wheel cylinders also rapidly increases accordingly until the ball valve shifts to the valve closing position even after the deceleration has reached a predetermined value so that the flexing point in a braking force distribution curve appears at a higher pressure level as compared with the case when brakes are applied in the normal manner. As a consequence, the braking force distribution is by far departed from the idealized distribution so that the rear-wheels may be braked too much.

SUMMARY OF THE INVENTION

Accordingly, one of the objects of the present invention is to provide a deceleration-sensitive, brake fluid pressure control valve which may substantially solve the above and other problems encountered when brakes are suddenly applied.

To this end, briefly stated, the present invention provides a control valve wherein a variable restriction means is so disposed upstream or downstream of a valve chamber housing the ball valve of the type described as to be actuable in response to the flow rate of brake fluid flowing from a master cylinder to rear-wheel cylinders in such a manner that when the flow rate exceeds a predetermined value, the flow of brake fluid is restricted thereby reducing the pressure of brake fluid. As a result the pressure increase of brake fluid in the rear-wheel cylinders due to delay in response of the ball valve operation may be positively retarded so that the departure of the braking force distribution from an idealized one may be avoided even in case of abrupt brake application.

BRIEF DESCRIPTION OF THE DRAWINGS

FIGS. 1, 2 and 3 are cross sectional views of first, second and third embodiments, respectively, of a control valve in accordance with the present invention.

Same reference numerals are used to designate similar parts throughout the figures.

DETAILED DESCRIPTION OF PRESENTLY PREFERRED EMBODIMENTS

First Embodiment, FIG. 1

Figure 3:
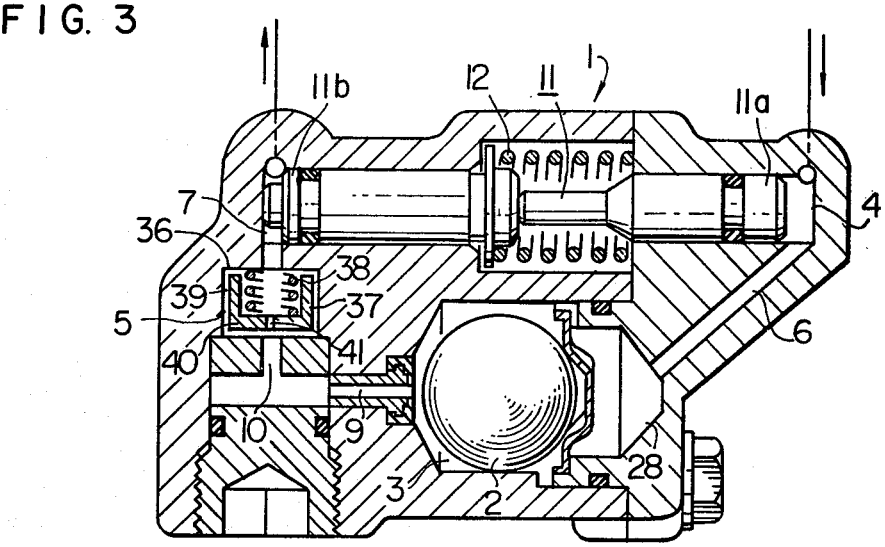

In FIG. 1 there is shown a first embodiment of a control valve in accordance with the present invention. The control valve has a housing 1 consisting of a main body 1a and an end cover 1b which is rigidly bolted or otherwise secured to the main body 1a after other parts to be described below have been assembled. The main body 1a has a valve chamber 3 defined in the lower section thereof, and a ball valve 2 is floatingly disposed therein. The valve chamber 3 is hydraulically communicated through a variable restriction means 5 to be described in detail hereinafter and an inlet passage 6 with an inlet chamber 4 which in turn is communicated through a brake line to a master cylinder 13 operatively connected to a brake pedal 15 and hydraulically communicated through a brake line with front-wheel cylinders 14a. The valve chamber 3 is further communicated through a valve port 9 and an outlet passage 10 with an outlet chamber 7 which in turn is communicated through a brake line with rear-wheel cylinders 14b.

A differential piston generally indicated by 11 and disposed in the upper section of the main body 1a consists of a small-diameter piston 11a and a large-diameter piston 11b and a bias spring 12 is disposed for biasing the differential piston 11 to the left in FIG. 1. The pressure of the brake fluid from the master cylinder 13 is exerted to the end face of the small-diameter piston 11b which is exposed to the inlet chamber 4, while the pressure of the brake fluid from the rear-wheel cylinders 14b, on the end face of the large-diameter piston 11b exposed to the outlet chamber 7.

In order to vent the air entrapped in the valve chamber 3, a vent plug 16 screwed into the main body 1a is provided.

The variable restriction means generally indicated by 5 consists of a sleeve 19 liquid-tightly fitted into a bore 17 formed in the end cover 1b contiguous with the valve chamber 3, a piston 20 coaxially fitted into the sleeve 19 for slidable movement therein and a bias spring 26 fitted over the reduced diameter section of the piston 20. The sleeve 19 has an end or bottom wall 18 with a flange 21 which is abutted against a step 22 formed between the valve chamber 3 and the bore 17 so that the sleeve 19 is securely held in position. The end wall 18 of the sleeve 19 is formed at the center portion thereof with a plurality of equiangularly spaced restriction or orifice passages 23 which extend radially outwardly toward the valve chamber 3, and a passage 24 extending through the end wall 18 at an offset portion thereof and having a cross sectional area greater than that of the restriction passages 23. Thus a space 27 defined between the sleeve 19 and the piston 20 is hydraulically communicated through these restriction passages 23 and the passage 24 with the valve chamber 3. A coaxial passage 25 extending through the piston 20 has a diameter sufficient enough for encircling all operatings of the restriction passages 23 opening at the interior surface of the end wall 18.

The bias spring 26 normally biases the piston 20 to the right in FIG. 1 so that the right end of the piston 20 is made into abutment with the bottom edge of the bore 17 while the left end is moved away from the end wall 18 leaving the space 27 therebetween. The bottom of the bore 17 is terminated into a well 28 which is hydraulically communicated with the inlet passage 6 so that the pressure of brake fluid supplied from the master cylinder is always exerted to the left end face of the piston 20.

Next the mode of operation of the first embodiment with the above construction will be described. In the initial stage of brake application, the ball valve 2 in the valve chamber 3 is located in its rear position to open the valve port 9 so that as the pressure increases in the master cylinder 13, the hydraulic pressure in the rear-wheel cylinders 14b increases accordingly and the inlet and outlet chambers 4 and 7 are substantially equal in hydraulic pressure. Since the area of the free end face of the large-diameter piston 11b is greater than that of the free end face of the small-diameter piston 11a, the differential piston 11 is forced toward the inlet chamber 4 against the bias spring 12. When the pressure in the rear-wheel cylinder 14b rises gradually and reaches such a magnitude that the deceleration of an automotive vehicle reaches a predetermined value, the ball valve 2 is caused by its inertia to move forward (to the left in FIG. 1) to thereby close the valve port 9 so that the hydraulic communication between the master cylinder 13 and the rear-wheel cylinders 14b is interrupted. As a consequence, the rise in hydraulic pressure in the master cylinder 13 is not directly transmitted to the rear-wheel cylinders 14b, but the pressure in the inlet chamber 4 continues to rise over the pressure in the outlet chamber 7 so that the differential piston 11 is forced toward the outlet chamber 7, thereby exerting the pressure to the brake fluid entrapped in the rear-wheel brake line downstream of the valve chamber 3. Thus after the valve port 9 has been closed with the ball valve 2, the rise in hydraulic pressure in the master cylinder 13 is indirectly transmitted to the rear-wheel cylinders 14b through the differential piston 11, and in this indirect hydraulic pressure transmission the pressure transmitted to the rear-wheel cylinders 14b is reduced by a factor equal to the ratio of the area of the free end face of the small-diameter piston 11a to the area of the free end face of the large-diameter piston 11b. The comparison of the hydraulic pressure rise between the front-wheel cylinders 14a and the rear-wheel cylinders 14b shows that the hydraulic pressure increases at the same rate in both the front- and rear-wheel cylinders 14a and 14b until the ball valve 2 closes the valve port 9 and thereafter the rate of hydraulic pressure rise in the rear-wheel cylinders 14b becomes slower than that in the front-wheel cylinders 14a.

Figure 4:
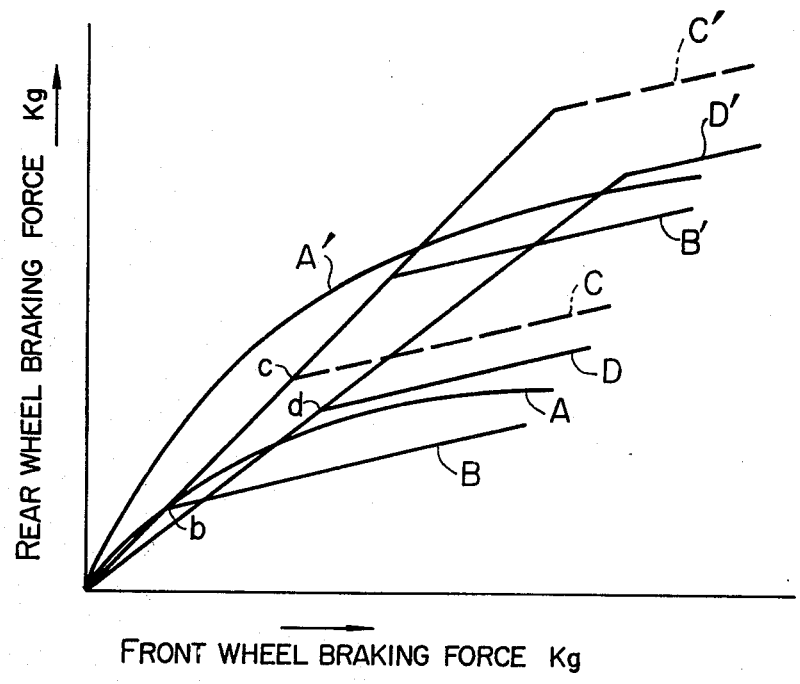
FIG. 4 shows various braking force distribution characteristic curves used for the explanation of the control valves in accordance with the present invention.

In FIG. 4 the relation between the braking forces applied to the front and rear wheels is shown. The characteristic curve B indicates the relation or distribution of the braking forces between the front and rear wheels under no load-laden condition of a vehicle, and consists of two straight lines connected with each other at a flexing point b corresponding to the time when the ball valve 2 closes the valve port 9. It is seen that the characteristic curve B is approximately similar to the characteristic curve A indicating the idealized distribution of braking forces under no load-ladon condition theoretically determined.

The mode of operation so far described above applies when a driver applies brake in the normal manner, but when the suddenly depresses the brake pedal 15, the rapid pressure build-up results in the master cylinder 13. Furthermore there exists some delay in time from the moment the deceleration reaches a predetermined value to the moment the ball valve 2 responds to this deceleration to shift itself forward to close the valve port 9. As a result, a further pressure build-up is permitted during this time delay in the rear brake line so that the hydraulic pressure in the rear-wheel cylinders 14b at the moment the ball valve 2 closes the valve port 9 becomes higher than the hydraulic pressure when brake is applied in the normal manner. In this case the braking force distribution is indicated by the curve C in FIG. 4 under no load-laden condition. It is seen that the flexing point c of the curve C is considerably higher than the flexing point b and the curve C is located considerably higher than the idealized characteristic curve A. As a consequence, the rear wheels are locked.

However, the above problem is solved by the provision of the variable restriction means 5 in accordance with the present invention. Referring back to FIG. 1, during the normal brake application the piston 20 remains in its rear position shown in FIG. 1 so that the brake fluid flows from the well 28 through the coaxial passage 25, the space 27, the restriction passages 23 and the large-diameter passage 24 into the valve chamber 3, from which the brake fluid flows through the valve port 9 into the rear brake line. The pressure drop between the master cylinder 13 and the rear-wheel cylinders 14b is negligible so that the braking force distribution is indicated by the characteristic curve B in FIG. 4 as with the case of a brake system incorporating no variable restriction means 5. When a driver suddenly depresses the brake pedal, the rapid hydraulic pressure build-up results in the master cylinder 13 as described above and the brake fluid is forced to flow through the coaxial passage 25 of the piston 20 at a higher flow rate so that the pressure difference results between the well 28 and the space 27 disposed upstream and downstream of the piston 20, respectively. When this pressure difference exceeds the biasing force of the spring 26, the piston 20 is forced to move to the left and is pressed against the end wall 18 so that the space 27 disappears. As a result, the brake fluid flows only through the restriction passages 23 into the valve chamber 3, and with respect to the hydraulic pressure on the side of the master cylinder 13 the hydraulic pressure on the side of the read-wheel cylinders 14b drops by a magnitude corresponding to energy dissipated by the brake fluid flowing through the restriction passages 23 against their resistance. Thus the hydraulic pressure rise rate in the rear wheel cylinders 14b is lower than that in the front-wheel cylinders 14a. The braking force distribution characteristic curve D in FIG. 4 indicates this braking operation. It is seen that the curve D has in the initial phase of braking a gradient less than those of the curves B and C which indicate the braking operation when the variable restriction means 5 is not actuated and the braking operation of the system having no variable restriction means 5.

After the variable restriction means 5 has been actuated in the manner described above, the ball valve 2 responds to a predetermined deceleration level to move forward to close the valve port 9. Even when the degree of delay in response of the ball valve 2 is similar to that of a brake system without no variable restriction means 5, the hydraulic pressure in the rear-wheel cylinders 14b when the valve port 9 has been closed is considerably lower than that of the brake system with no variable restriction means 5 because the hydraulic pressure in the rear-wheel cylinders 14b is gradually increased in the manner described above. Therefore, the characteristic curve D flexes at the point d near the idealized characteristic curve A as compared with the flexing point c of the characteristic curve C so that the deviation of the curve D from the curve A may be minimized. Thus the provision of the variable restriction means 5 in accordance with the present invention may substantially solve the problem that the rear wheels are locked when brake is applied abruptly due to the delay in response of the ball valve 2.

In FIG. 4, the characteristic curves A', B', C' and D' indicate, respectively, the idealized braking force distribution under load-laden condition of the vehicle, that of a prior art brake system or the brake system incorporating the control valve in accordance with the present invention when the brake is applied in the normal manner, that of the prior art brake system when brake is abruptly applied, and that of the brake system incorporating the control valve in accordance with the present invention in case of the abrupt brake application.

Second Embodiment, FIG. 2

The second embodiment shown in FIG. 2 is substantially similar in construction to the first embodiment described hereinbefore in conjunction with FIGS. 1 and 4 except the arrangement of the ball valve 2 and the construction of the variable restriction means. That is, the bore 17 is eliminated and the well 28 is formed contiguous with the valve chamber 3 and hydraulically communicated through the inlet passage 6 with the inlet chamber 4. A sleeve-shaped hollow piston 29 with an open front end is fitted into the valve chamber 3 for axial slidable movement therein, and the ball valve 2 is disposed within the hollow piston 29. Formed in the rear portion of the pheripheral wall of the valve chamber 3 are a plurality of circumferentially equidistantly spaced apart grooves 30 which extend in parallel with the axis of the hollow piston 29 and are hydraulically communicated with the well 28 through corresponding inclined grooves or passages 31 formed in the rear end portion of the hollow piston 29 around the periphery thereof. A restriction passage 33 is formed through the rear end wall 32 of the hollow piston 29 to communicate the well 28 and the hollow space of the piston 29. A bias spring 34 is fitted around the hollow piston 29 for normally biasing the hollow piston 29 to the right to abut against the rear wall of the valve chamber 3 and to leave a space between the front end of the hollow piston 29 and the front end wall of the valve chamber 3. The hollow piston 29 has a reduced diameter in the front half thereof to define an annular passage 25 therearound. The length of the annular passage 35 is so selected that its rear end slightly overlaps the front ends of the grooves 30, so as to communicate the grooves 30 with the space of the valve chamber 3 in front of the piston 29 in the position shown in FIG. 2.

Next the mode of operation of the second embodiment with the above construction will be described. When brakes are applied in the normal manner, the pressure build-up in the master cylinder 13 is transmitted through the inlet chamber 4 and the inlet passage 6 to the well 28, from which the hydraulic pressure rise is further transmitted through not only the restriction passage 33 but also the inclined grooves 31, the axial grooves 30 and the annular passage 35 to the valve chamber 3 and hence to the rear-wheel cylinders 14b. As with the first embodiment the pressure drop is negligible and the control valve operates in a manner substantially similar to that of the prior art control valves.

In case of the abrupt brake application, the brake fluid flows at higher rates through the restriction passage 33, the grooves 31 and 30 and the annular passage 35, the pressure difference results between the well 28 and the valve chamber 3 so that the hollow piston 29 is forced to move forward against the bias spring 34 and consequently the fluid flow through the grooves 31 and 30 and the annular passage 35 is interrupted. As a result, the further increase in hydraulic pressure in the master cylinder 13 is transmitted only through the restriction passage 33 to the rear brake line, and the hydraulic pressure drops in transmission by a magnitude corresponding to energy dissipated by the brake fluid when it flows through the restriction passage 33 against its resistance. Thus as with the first embodiment the departure from the idealized characteristic curve due to the delay in response of the ball valve 2 may be corrected.

One of the essential features of the second embodiment is that the hollow piston 29 in which is disposed the ball valve 2 is caused to move forward when brakes are abruptly applied so that the stroke of the ball valve 2, that is the distance between the valve port 9 and the ball valve 2 in the inoperative position, may be advantageously reduced. As a result not only the increase in hydraulic pressure in the rear wheel cylinders 14b may be effectively retarded when brakes are abruptly applied but also the delay in response of the ball valve to a predetermined deceleration level may be considerably minimized so that the braking force distribution characteristic may be improved more that the first embodiment.

Third Embodiment, FIG. 3

Whereas the variable restriction means is disposed upstream of the ball valve 2 in the first and second embodiments, it may be disposed downstream of the ball valve 2 as will be described below. Part of the outlet passage 10 communicating the valve port 9 and the outlet chamber 7 is enlarged to define a piston chamber 36 into which is slidably fitted a hollow piston 37 with an open top end. A bias spring 38 is loaded in such a manner that the hollow piston 37 may be normally retained in its lower position shown in FIG. 3. A plurality of circumferentially equiangularly spaced grooves 39 are formed in the exterior wall of the hollow piston 37, and a restriction passage 41 is formed through the lower end wall 40 of the hollow piston 37 coaxially thereof.

When brakes are applied in the normal manner, the pressure rise in the master cylinder 13 is transmitted through the valve chamber 3, the valve port 9, the axial grooves 39 and coaxial restriction passage 41 of the hollow piston 37 to the rear-wheel cylinders 14b, and the pressure drop between the master cylinder and the rear-wheel cylinders is negligible. Thus the braking operation is substantially similar to that of a prior art brake system without no variable restriction means 5.

When brakes are abruptly applied, the brake fluid is forced to flow through the axial grooves 39 and the coaxial restriction passage 41 at higher flow rates so that the pressure difference results across the hollow piston 37 and consequently the piston 37 is caused to move upward against the bias spring 38 with the upper end abutting against the top wall of the piston chamber 36. As a result, the fluid flow through the axial grooves 39 of the piston 37 is interrupted so that the brake fluid is forced to flow only through the coaxial restriction passage 41 and thus the pressure drops. Thus the pressure rise in the rear brake line is retarded as in the case of the first or second embodiment.

In summary according to the present invention the variable restriction means is provided which is actuable in response to the rapid flow of the brake fluid resulting from the abrupt brake application so that the flow of brake fluid flowing from the master cylinder to the rear-wheel cylinders may be automatically restricted to restrict within a predetermined range the increase in pressure in the rear-wheel cylinders due to the delay in response of the ball valve operation. Thus irrespective of the normal or abrupt or sudden brake application, brakes may be applied always in an extremely stable manner.

It is to be understood that the present invention is not limited to the preferred embodiments described above in conjunction with the accompanying drawings and that various modifications may be effected without departing the true spirit of the present invention.

What is claimed is:

1. In a control valve for use in an automotive hydraulic brake system for controlling the pressure of brake fluid transmitted to rear wheel cylinders, said control valve comprising:
    a valve chamber communicated with a master cylinder and communicated through a valve port with the rear wheel cylinders,
    a ball valve floatingly disposed in said valve chamber and adapted to move forward by its own inertia to close said valve port when the deceleration of an automotive vehicle reaches a predetermined value,
    an improvement comprising variable restriction means disposed in the line communicating said master cylinder through said valve chamber with said rear wheel cylinders and including a control member responsive to the flow rate of brake fluid through said line for controlling said flow rate and adapted to move from a first position at which the restriction of said flow rate is minimum toward a second position at which the restriction of said flow rate is maximum when said flow rate exceeds a predetermined value and a spring for urging said control member toward said first position;
    said variable restriction means comprising at least two passages which are arranged in parallel relation with each other so as to divide the flow of brake fluid through said line into at least two flows, and a valve member responsive to the predetermined flow rate of brake fluid through said line for closing at least one of said parallel passages.

2. An improvement as set forth in claim 1, further comprising:
    an inlet chamber communicated with the master cylinder and communicated through an inlet passage with said valve chamber,
    an outlet chamber communicated with the rear wheel cylinders and communicated through an outlet passage and said valve port with said valve chamber, and
    a differential piston interposed between said inlet and outlet chambers with its free ends being exerted with the hydraulic pressures in said inlet and outlet chambers, respectively.

3. An improvement as set forth in claim 1, wherein said one of parallel passages adapted to be closed by said valve member has a diameter larger than that of the other parallel passage.

4. An improvement as set forth in claim 1, wherein said variable restriction means comprises a piston chamber having one end closed with an end wall through which extend said parallel passages to communicate said piston chamber with said valve chamber and the other end hydraulically communicated with said inlet chamber through said inlet passage, a piston slidably fitted into said piston chamber, one end of said piston being adapted to engage with said end wall of said piston chamber, an axial passage extending through said piston with its one open end being made into hydraulic communication only with said other parallel passage when said one end of said piston is brought into engagement with said end wall of said piston chamber and its other open end being always communicated with said inlet passage, and a bias spring loaded on said piston for normally biasing said piston toward said inlet passage.

5. An improvement as set forth in claim 1, wherein said variable restriction means comprises a piston chamber disposed in said line, a hollow piston with an open front end and a closed rear end axially slidably fitted into said piston chamber, the open front end of said hollow piston being adapted to engage with an end wall on the side of the outlet of said piston chamber, said one parallel passage consisting of a plurality of axial grooves formed around said hollow piston for communicating the space defined in said piston chamber behind said hollow piston with the space defined in said piston chamber in front of said hollow piston, said other parallel passage being formed through a wall of said hollow piston at its closed rear end for always communicating the space defined in said piston chamber behind said hollow piston with the interior of said hollow piston, and a bias spring for normally biasing said hollow piston toward the inlet of said piston chamber.

6. An improvement as set forth in claim 5, wherein said piston chamber is disposed in said outlet passage with its inlet in communication with said valve chamber through said valve port and its outlet in communication with said outlet chamber, and said bias spring is disposed within said hollow piston and loaded between said end wall of said piston chamber at its outlet side and said closed rear end wall of said hollow piston.

7. An improvement as set forth in claim 1, wherein said variable restriction means comprises a hollow piston with an open front end and a closed rear end axially slidably fitted into said valve chamber, said open front end being adapted to engage with an end wall of said valve chamber on the side of said valve port, said ball valve being floatingly disposed in said hollow piston, said one parallel passage consisting of at least one groove formed around said hollow piston for communicating said inlet passage with the space defined in said valve chamber in front of said piston, said other parallel passage being formed through the rear end wall of said hollow piston for always communicating said inlet passage with the interior of said hollow piston and hence said valve chamber, and a bias spring for normally biasing said hollow piston toward said inlet passage.

* * * * *